United States Patent [19]
Oka et al.
[11] 3,863,218
[45] Jan. 28, 1975

[54] PATTERN FEATURE DETECTION SYSTEM

[75] Inventors: Mitsunori Oka; Shinji Yamamoto, both of Hachioji; Shozo Kadota, Kokubunji, all of Japan

[73] Assignee: Hitachi, Ltd., Tokyo, Japan

[22] Filed: Jan. 26, 1973

[21] Appl. No.: 327,157

[52] U.S. Cl. .............. 340/146.3 AE, 340/146.3 AC
[51] Int. Cl. .............................................. G06k 9/16
[58] Field of Search .......... 340/146.3 AC, 146.3 AE

[56] References Cited

UNITED STATES PATENTS

| | | | |
|---|---|---|---|
| 3,245,036 | 4/1966 | Grottrup | 340/146.3 AE |
| 3,268,864 | 8/1966 | Kubo | 340/146.3 AE |
| 3,344,399 | 9/1967 | Bonner | 340/146.3 AE |
| 3,609,685 | 9/1971 | Deutsch | 340/146.3 AE |
| 3,713,098 | 1/1973 | Muenchhausen | 340/146.3 AC |

*Primary Examiner*—Gareth D. Shaw
*Assistant Examiner*—Robert F. Gnuse
*Attorney, Agent, or Firm*—Craig & Antonelli

[57] ABSTRACT

A pattern feature detection system which detects the slope at any point of a line pattern to be identified to determine whether the pattern is monotonously increasing or monotonously decreasing at that point, thereby dividing the pattern into line segments at positions where the sign of the monotonousness changes, that is, at positions of zero slope.

12 Claims, 17 Drawing Figures

FIG. 3d

| No. | 1 | 2 | 3 | 4 | 5 |
|---|---|---|---|---|---|
| (X.Y) | (5.3) | (12.3) | (3.6) | (6.8) | (10.8) |
| MX | 2 | 1 | 2 | 1 | 2 |

FIG. 3e

| No. | I | II | III | IV |
|---|---|---|---|---|
| SS | 1 | 1 | 2 | 3 |
| EE | 3 | 5 | 5 | 4 |
| SD | 3 | 0 | 2 | 1 |
| ED | 2 | 1 | 3 | 0 |
| MC | 3 | 6 | 5 | 3 |
| MF | 3 | 1 | 3 | 1 |

FIG. 5
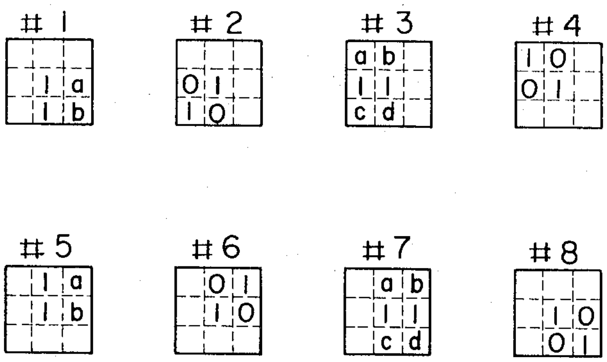
FIG. 6
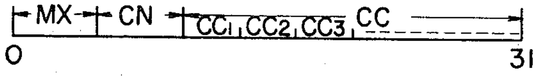
FIG. 7b
| MF \ CC | 0 | 1 | 2 | 3 |
|---|---|---|---|---|
| 0 | 0 | 1 | 1 | |
| 1 | 1 | 1 | 1 | D |
| 2 | 1 | 1 | 2 | 3 |
| 3 | D | D | 3 | 3 |

PATTERN FEATURE DETECTION SYSTEM

BACKGROUND OF THE INVENTION

1. Field of the Invention

The present invention relates to a pattern feature detection system, and more particularly to a pattern feature detecting system in which the feature of a pattern is detected by determining the slope of the pattern, the existence of which is always ensured by the continuity of the pattern, in particular by determining whether the slope represents the monotonic increase of the pattern or the monotonic decrease of the pattern.

2. Description of the Prior Art

As an effective procedure for detecting the feature of a pattern there is a method in which a pattern is divided into a number of characteristic parts in the direction of code based on the continuity of the pattern, an example of which is an article entitled "Character Feature Detection Employing Freeman Code" presented at the meeting of the "Study of Automaton" held on May 26, 1970 under the auspices of the Institute of Electronics and Communication Engineers of Japan. In this prior art method, straight and curved line segments are assumed to be principal constituent units of a pattern, the segments being bounded by a break point, inflection point or end point. The Freeman code provides an effective coding method useful in characterizing and tracking a pattern. In this coding method 360° is octasected at intervals of 45° and each octant is coded to orient the segment or pattern. The abovementioned prior art method is characterized in that straight line segments, curved line segments, break points, inflection points and end points are detected by the combination of the Freeman coding procedure and a predetermined logic.

This prior art methód has the disadvantage that the quantity of features to be detected is large and the logic per se is complicated so that the system for performing this method is a considerably large scale one. The principle cause of this disadvantage is the redundancy of information.

SUMMARY OF THE INVENTION

An object of the present invention is to provide a relatively simple pattern feature detection system by reducing redundancy of information.

The present invention is characterized by the fact that a continuous line pattern is divided into line segments by points at which the sign of the slope of the pattern changes or the slope of the pattern is zero to detect the feature of the entire pattern.

According to the present invention there is provided a pattern feature detection system comprising preliminary processing means for shaping an input pattern into a line pattern, mask logic decoding means for detecting the branch number, the output direction code number and the direction code of the line pattern by subjecting the line pattern to a mask logic operation and for determining whether a point obtained by the mask logic operation is a characteristic point or a non-characteristic point by the branch number and the output direction code number, dividing point processing means for determining whether the non-characteristic point is a dividing point or a continuous point, characteristic point processing means for storing information about the characteristic point and the dividing point, and sub-chain processing means for serializing part patterns into which the line pattern is divided by the dividing point and the characteristic point and for extracting elements constituting each part pattern.

BRIEF DESCRIPTION OF THE DRAWING

FIGS. 3*a*to 3*e* are diagrams for more practically explaining the processing method employed by the pattern feature detecting system according to the present invention.

FIG. 5 is masks employed in the present invention.

FIG. 6 is a structure of a data.

FIG. 7*b* is a method table representing the relation between two codes.

DESCRIPTION OF THE PREFERRED EMBODIMENT

Figure 1:
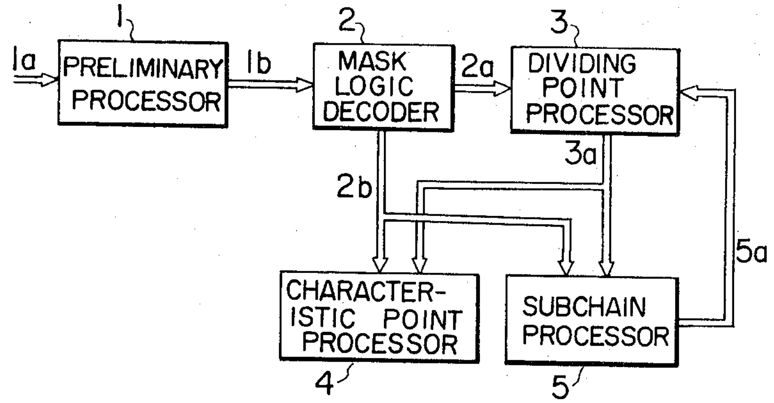
FIG. 1 is a fundamental structure of the pattern feature detection system according to the present invention.

The fundamental structure of the pattern feature detection system according to the present invention will be described with reference to FIG. 1. A preliminary processing apparatus 1 shapes an input pattern 1*a* obtained by, for example, digitally scanning a chart into a line pattern 1*b* by reducing the width of the line or band of the pattern and by supplementing defect or lacking parts of the pattern by necessary data.

Figure 3A:
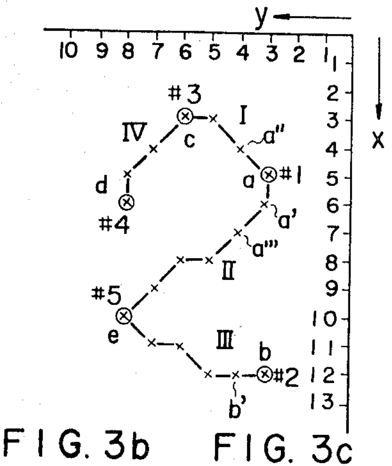
Figure 3B:
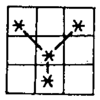
Figure 3C:
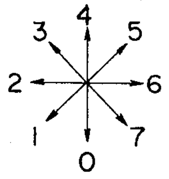

The line pattern 1*b* provided by the preliminary processing apparatus 1 is subjected to a mask logic decoder 2. The mask logic decoder 2 scans the line pattern in vertical directions at predetermined intervals in a horizontal direction in accordance with a mask logic of, for example, 3 × 3 as shown in FIG. 5 to detect the branch number MX, the output direction code number CN and the output direction code CC. The direction of pattern is coded as shown in FIG. 3*c*. When the 3 × 3 mask logics shown in FIG. 5 are applied to a particular pattern as shown in FIG. 3*b*, the number of the masks which are satisfied by the pattern among the eight masks No. 1 to No. 8 in FIG. 5 is called the branch number MX, the number of the masks which are satisfied by the pattern among the four masks No. 1 to No. 4 is called the output direction code number CN, and each of the direction codes of the masks No. 1 to No. 4 satisfied by the pattern is called the output direction code. Consequently, the information obtained by applying the 3 × 3 mask logic to the pattern shown in FIG. 3*b* is MX = 3, CN = 2, CC(1) = 0 and CC(2) = 3.

Figure 2:
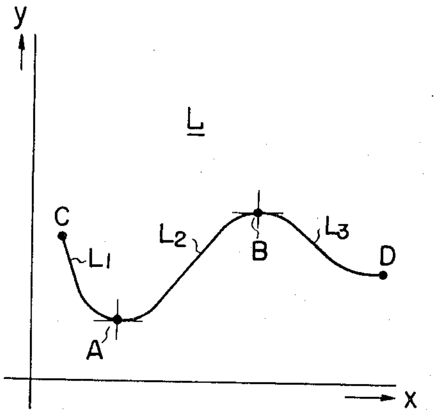
FIG. 2 is a schematic diagram for explaining an aspect of the processing method employed by the pattern feature detecting system according to the present invention.

The mask logic decoder 2 selectively supplies the above-mentioned information to a dividing point processing apparatus 3 and a characteristic point processing apparatus 4 under a particular codition. The particular condition is such a one that determines whether the point resulted from subjecting the pattern to the mask logic is regarded as a dividing point or as a characteristic point. The term "characteristic point" used in the present invention indicates one of three kinds of points, a starting point, a branch point and a terminal point. These points are representative characteristics of the pattern, and generally a pattern is divided into a number of parts by these points. If each of these parts is called a sub-chain, each of the above-mentioned points is either an initial point or a final point of a sub-chain. On the other hand, the dividing point used in the present invention is determined from the point of view of the monotonic increase and the monotonic decrease which are principal concepts according to the present invention. Consider a continuous pattern L having a starting point C and a terminal point D as shown in FIG. 2. The pattern L can be divided into three part patterns $L_1$, $L_2$ and $L_3$ by a minimum point A and a maximum point B at which the sign of the slope changes, that is, the slope of the pattern L or of the tangent to the pattern L is zero. The points A and B are information necessary for detecting the principal feature of the pattern L, and are called dividing points in the present invention. Thus, the dividing point, different from the other characteristic points, the starting point, the branch point and the terminal point, always lies on the continuous part of the pattern. On the continuous part of the pattern also exist true continuous points in addition to the dividing point. Consequently, in order to supply the characteristic points and the dividing points separately to the characteristic point processing apparatus 4 and the dividing point processing apparatus 3, respectively, it is first necessary to determine whether the point is a characteristic point or a non-characteristic point (the non-characteristic point includes the true continuous point and the dividing point). Then, if the detected point is a characteristic point, it is supplied to the characteristic point processing apparatus 4. On the other hand, if the detected point is a non-characteristic point, it is further determined whether the non-characteristic point is a dividing point or a true continuous point. If the non-characteristic point is a dividing point, it is supplied to the dividing point processing apparatus 3. Thus, the mask logic decoder 2 has the function that it detects the branch number MX, the output direction code number CN and the direction code CC by applying masks to a pattern, that it detects whether the point obtained by the application of the mask to the pattern is a characteristic point or a non-characteristic point, and that it detects whether the non-characteristic point is a dividing point or a true continuous point. However, in the following description the function of determining whether the non-characteristic point is a dividing point or a true continuous point among the functions of the mask logic decoder 2 is given to the dividing point processing apparatus 3. The distinction between the characteristic point and the non-characteristic point is performed based on the branch number MX and the output direction code number CN. In the case of the characteristic point, the branch number MX and the output direction code number CN are not determined uniquely, while in the case of the above-mentioned non-characteristic point, MX = 2 and CN = 1. Consequently, for discriminating whether a point is a characteristic point or a non-characteristic point it is only sufficient to determine such that when MX = 2 and CN = 1, the point is a non-characteristic point, and when MX = 2 and CN = 1 are not simultaneously satisfied, the point is a characteristic point.

The dividing point processing apparatus 3 which discriminates between the dividing point and the continuous point plays a major role in the present invention. This discrimination is done by comparing the direction code CC from the mask logic decoder 2 with the advance direction code MF from a sub-chain processing apparatus 5 to decide whether the pattern is monotonously increasing or monotonously decreasing. The advance direction code MF is checked each time the mask logic is applied to the pattern by scanning, and is cleared, if the decision of the characteristic point is done, to newly set the direction code CC obtained by the application of the mask logic as the advance direction code MF. At the stage in which continuous points are present consecutively, the advance direction code MF is compared incessantly with the direction code CC obtained by the application of the mask logic to decide whether or not the newly obtained direction code CC has the monotonousness (monotonously increasing tendency or monotonously decreasing tendency) as viewed from the then advance direction code MF. If the monotonousness is held, the point to which the mask is applied is decided as a continuous point, and if the monotonousness is not held, the point is decided as a dividing point. When the dividing point is decided, the advance direction code MF is cleared similarly at the time when the characteristic point is detected. In the case of the continuous point, when a particular relation is obtained between the advance direction code MF and the direction code CC, a particular direction code determined by the particular relation is set as the advance direction code MF. A detailed description thereof will be made below.

The characteristic point processing apparatus 4 receives information concerning the characteristic point provided by the mask logic decoder 2 and information concerning the dividing point provided by the dividing point processing apparatus 3. In the characteristic point processing apparatus 4 the characteristic point and the dividing point are not specifically distinguished and processed similarly. Thus, the dividing point is regarded as a characteristic point in a wide sense. The characteristic point processing apparatus 4 calculates the sequence number of the characteristic point indicating the order or sequence of occurrence of the characteristic point including the dividing point, the branch number MX at the characteristic point, and the coordinates (X,Y) of the point at which the characteristic point appears, or stores the information provided by the other apparatuses.

The sub-chain processing apparatus 5 puts in order or serializes the part patterns $L_1$, $L_2$ and $L_3$, divided by the dividing points and the characteristic points as shown in FIG. 2, in this sequence and extracts various elements constituting individual part patterns $L_1$, $L_2$ and $L_3$. The pattern defined by the various elements is called a sub-chain. The elements constituting the sub-chain consist of the direction code SD at the starting point of the sub-chain, the entire code length MC, the direction code ED at the terminal point, the serial numbers SS and EE of the starting and terminal points, respectively, the serial number of the sub-chain per se, and the content MF of the monotonousness. Some of the elements are not necessarily required. The direction codes at the starting and terminal points or the code length is not specifically required if the pattern to be detected is of a simple configuration. The kind and number of elements are determined as required by the reproducibility of the pattern and the redundancy of the information.

Processing of the pattern will next be described. FIG. 3*a* shows a line pattern "2." This pattern is outputted by the preliminary processing apparatus 1 and mask-processed by the mask logic decoder 2. In the mask logic decoder 2 the pattern is scanned in the $x$-direction at $y$=1, then scanned in the $x$-direction at $y$=2, and so on from upper to lower direction and from right to left direction. When the point *a* is reached in the course of scanning, the effective mask processing appears for the first time. The point *a* is the right-hand edge of the pattern "2." As a result of the mask-processing MX = 2 and CN = 2 appear and various bits of information are supplied to the characteristic point processing apparatus 4 and the point *a* is processed as the starting point.

In the characteristic point processing apparatus 4 the sequence number K, the coordinates (X, Y) and the branch number MX are registered. At the point *a*, K = 1, (X, Y) = (5, 3) and MX = 2 are registered. Next, when the scanning point is shifted to the point *a'*, MX = 2 and CN = 1 are detected and the processing is transferred to the dividing point processing apparatus 3. However, since the point *a'* is not a dividing point but a true continuous point, the dividing point processing is not performed but the continuous point processing is performed. Then, when the scanning point is further shifted to the point *b*, MX = 1 and CN = 1 are obtained by the mask logic and various bits of information are supplied to the characteristic point processing apparatus 4. In the characteristic point processing apparatus 4 the point *b* is decided to be a starting point, and, similarly to the point *a*, the sequence number K = 2, the coordinates (X, Y) = (12, 3) and the branch number MX = 1 are registered. The sequence numbers are serialized in accordance with the order of appearance of the characteristic points. Next, the scanning is performed in the $x$-direction with $y$=4. In the course of this scanning all of the points *a''*, *a'''* and *b'* are processed as true continuous points. A similar situation stands for the scanning along the line at $y$=5. The dividing point appears for the first time at the point *c* for the scanning along the line at $y$=6, and the dividing point processing apparatus 3 performs the dividing point processing. The dividing point is immediately supplied to the characteristic point processing apparatus 4 and the characteristic point sequence number K = 3, the coordinates (X, Y) = (3, 6) and the branch number MX = 2 are registered therein. The scanning is further carried on and the points d and e are respectively decided to be terminal points. The sequence number K = 4, the coordinates (X, Y) = (6, 8) and the branch number MX = 1 for the point *d* and the sequence number K = 5, the coordinates (X, Y) = (10, 8) and the branch number MX = 2 for the point 2 are registered in the characteristic point processing apparatus 4. The manner of registration of the characteristic points is shown in FIG. 3*d*.

FIG. 3*e* shows the result of the sub-chain processing by the sub-chain processing apparatus 5. The sub-chain indicates the state of the line segment between the characteristic points. The sub-chain processing apparatus 5 processes the information between the characteristic points in the order of the scanning. When the first characteristic point *a* appears, the sub-chain I in the direction to the third characteristic point *c* and the sub-chain II in the direction to the fifth characteristic point *e* are registered. At the same time the sequence numbers of the characteristic points SS = 1 and 1 and the direction codes SD = 3 and 0 at the starting points of the sub-chains I and II, respectively, are registered. When the scanning point is shifted to the second characteristic point *b*, the third sub-chain III is detected and the characteristic point sequence number SS = 2 and the direction code SD = 2 at the starting point of the sub-chain III are registered. When the scanning point then comes to the third characteristic point *c*, the first subchain I terminates and the characteristic point sequence number EE = 3 and the direction code ED = 2 at the terminal point are registered. On the other hand, the code length is counted during the scanning from the point *a* to the point *c*, and the entire code length MC = 3 is registered upon termination of the first sub-chain I. Also, as will be described below, on which code direction the shifting from the point *a* to the point *c* is based is calculated during the scanning. For the first sub-chain I the code direction MF = 3 is registered.

For the other sub-chains the information therefor is similarly registered. The second sub-chain II terminates at the characteristic point *e* and the characteristic point sequence number EE = 5, the direction code ED = 1, the entire code length MC = 6 and the code direction MF = 1 are registered. The third sub-chain III terminates at the characteristic point *e* and the characteristic point sequence number at the terminal point EE = 5, the direction code ED = 3, the entire code length MC = 5 and the code direction MF = 3 are registered. The fourth sub-chain IV starts at the third characteristic point *c* and terminates at the fourth characteristic point *d*, and the characteristic point sequence number at the starting point SS = 3, the characteristic point sequence number at the terminal point EE = 4, the direction code at the starting point SD = 1, the direction code at the terminal point ED = 0, the entire code length MC = 3 and the code direction MF = 1 are registered.

Figures 4A, 4B, 4C:
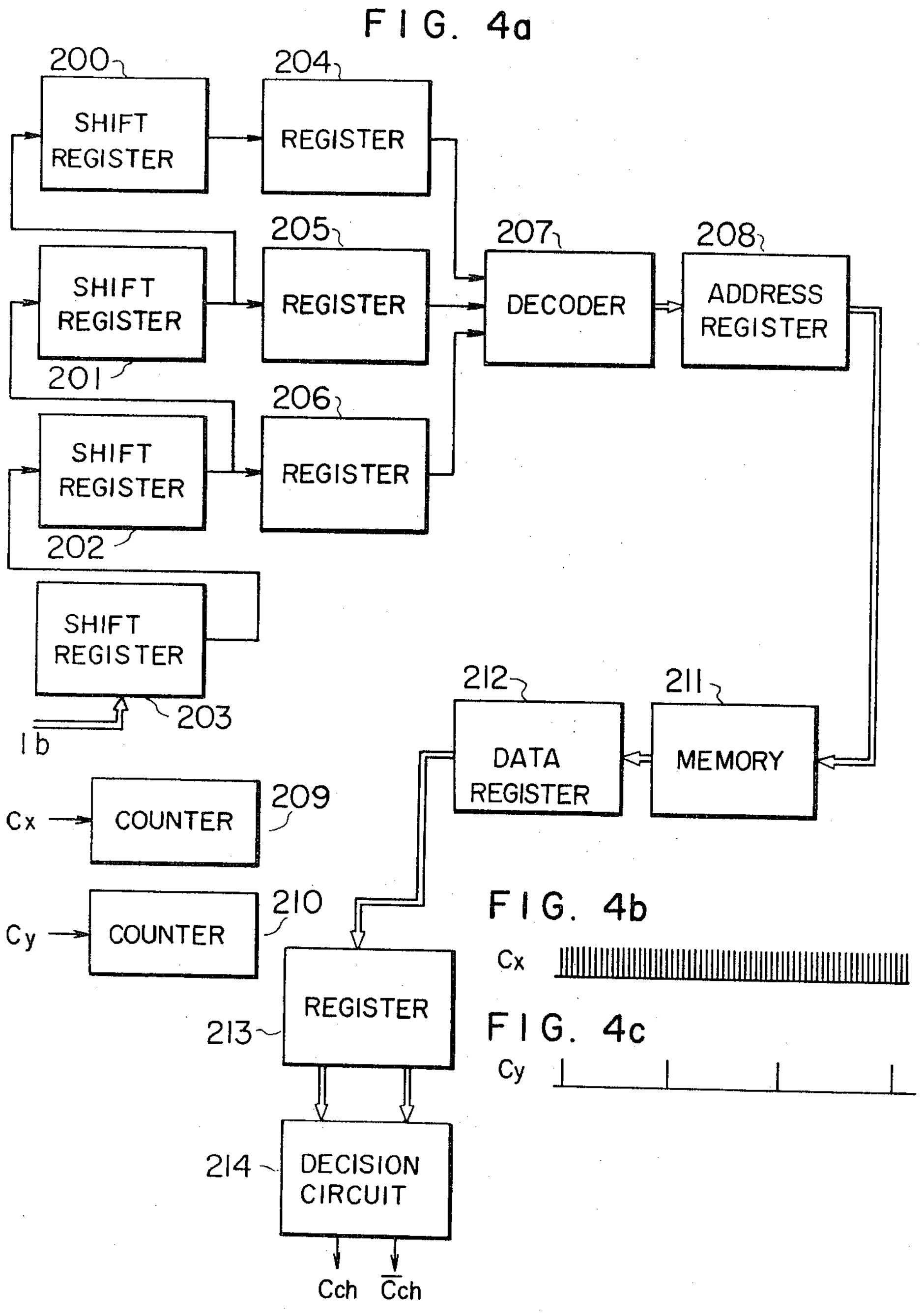
FIG. 4*a* is a mask logic decoder according to the present invention.
FIGS. 4*b* and 4*c* are clock pulses applied to the counter in the mask logic decoder of FIG. 4*a*.

FIG. 4*a* shows the structure of a mask logic decoder based on the table look up method, which comprises shift registers 200, 201, 202 and 203, registers 204, 205 and 206 each consisting of 3 bits, a decoder 207 for receiving signals of 3 × 3 bits from the registers 204, 205 and 206 and for reading out the address signal of a memory 211, an address register 208, the memory 211, a data register 212 for temporarily store the signal read from the memory 211, and counters 209 and 210 for indicating the coordinates ($x$, $y$) of the scanning point, respectively.

To the shift register 203 line patterns **1*b* of the $x$-direction concerning the scanning point $y$ are inputted at appropriate intervals. For example, if the scanning point in the $x$-direction is of 50 bits, a signal of 50 bits is inputted as the line pattern 1*b*. The bit number of each of the registers 200, 201 and 202 is the same as that of the register 203. The foremost one bits from the registers 202, 201 and 200 are shifted to the registers 206, 205 and 204, respectively, and, at the same time, to the vacant rearmost one bit positions of the registers 202, 201 and 200 produced by the shift the foremost one bits of the registers 203, 202 and 201** are shifted. Consequently, pattern signals in the *x*-direction corresponding to three consecutive positions $y_1$, $y_2$ and $y_3$ of the scanning point *y* are set in the shift registers 200, 201 and 202. In the registers 204, 205 and 206 are set signals of 3 × 3 bits, that is, signals capable of performing 3 × 3 mask logic processing. According to this structure signals of 3 × 3 bits which are objects of mask processing are sequentially provided by setting signals 1b in the register 203 at appropriate intervals and by shifting the set signals bit by bit to perform scanning.

To the counters 209 and 210 are applied clock signals C*x* and C*y* as shown in FIGS. 4*b* and 4*c*, respectively, and the scan coordinates are respectively counted. During one period of the clock signal C*y* the clock signal C*x* repeats the number of times corresponding to the number of all the scanning points in the *x*-direction. The counter 209 is cleared each time it counts all the scanning points in the *x*-direction and starts counting by the clock signal C*x* each time the clock signal C*y* is applied to the counter 210.

Figure 8:
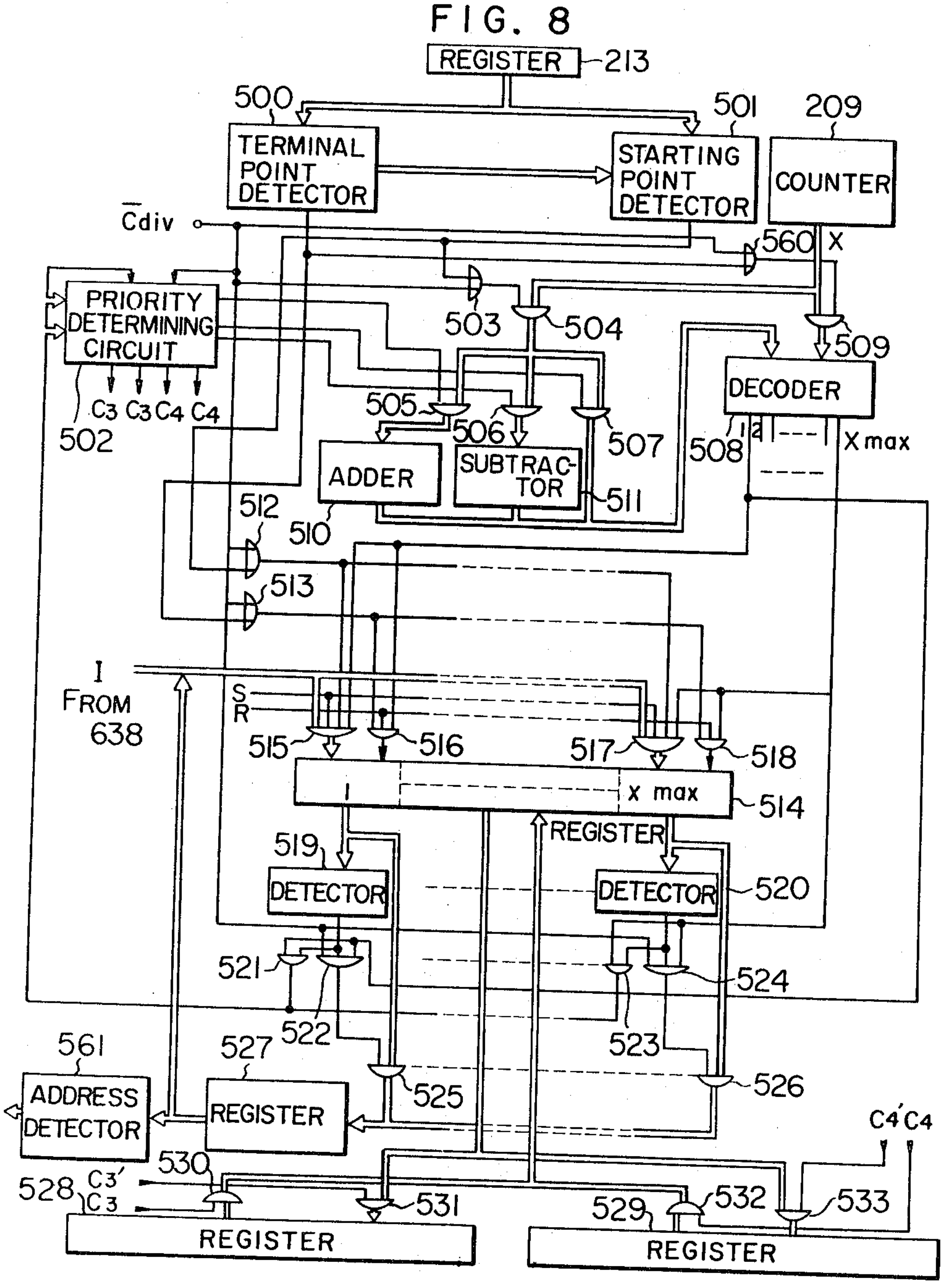
FIG. 8 is a control system of a sub-chain processing apparatus according to the present invention.

The decoder 207 receives signals of 3 × 3 bits from the registers 204, 205 and 206 and indicates the address in the memory. FIG. 5 shows mask logics. Eight masks in FIG. 8 are ones for detecting direction codes 0 to 7 (FIG. 3*c*), respectively. Patterns having the branch number MX ≥ 2 satisfy a plurality of masks. In the masks the logic elements *a, b, c* and *d* take binary values "0" and "1." Consequently, by applying the eight masks to an input pattern, and by examining which masks the input pattern satisfies, the branch number MX, the output direction code number CN and the output direction code CC thereof can be detected. By this method the mask logic is performed. However, in order to simplify the mask operation the present embodiment employs the table look up method. In the memory 211 are prepared $2^8$ addresses each of which corresponds to one mask. When input patterns of 3 × 3 bits are inputted from the registers 204, 205 and 206 to the decoder 207, the decoder 207 decodes the patterns to indicate addresses in the memory 211. The contents of each address in the memory 211 is shown in FIG. 6. As is evident from FIG. 6, the decoded branch number MX, output direction code number CN and output direction code CC ($CC_1$, $CC_2$, . . . ) are stored at each address. By this structure signals of 3 × 3 bits are decoded by the decoder 207 to indicate the address which is supplied to the memory 211 through the address register 208 and the content of the required address is read out in the data register 212.

A register 213 receives the contents of the data register 212 and supplies the contents to necessary parts. A decision circuit 214 receives the branch number MX and the output direction code CN out of the contents of the address read from the memory 211 and decides whether a point is a characteristic point or a non-characteristic point (i.e., a continuous point in the general sense). In the case of the continuous point, the branch number MX = 2 and the output direction code CN = 1. If these conditions are not satisfied, the point is a characteristic point. Consequently, the decision circuit 214 outputs two signals. When the conditions MX = 2 and CN = 1 are not satisfied, it outputs the characteristic point indicating signal C*ch*, and when the conditions MX = 2 and CN = 1 are simultaneously satisfied it supplies the continuous point indicating signal $\overline{C}ch$.

Figure 7A:
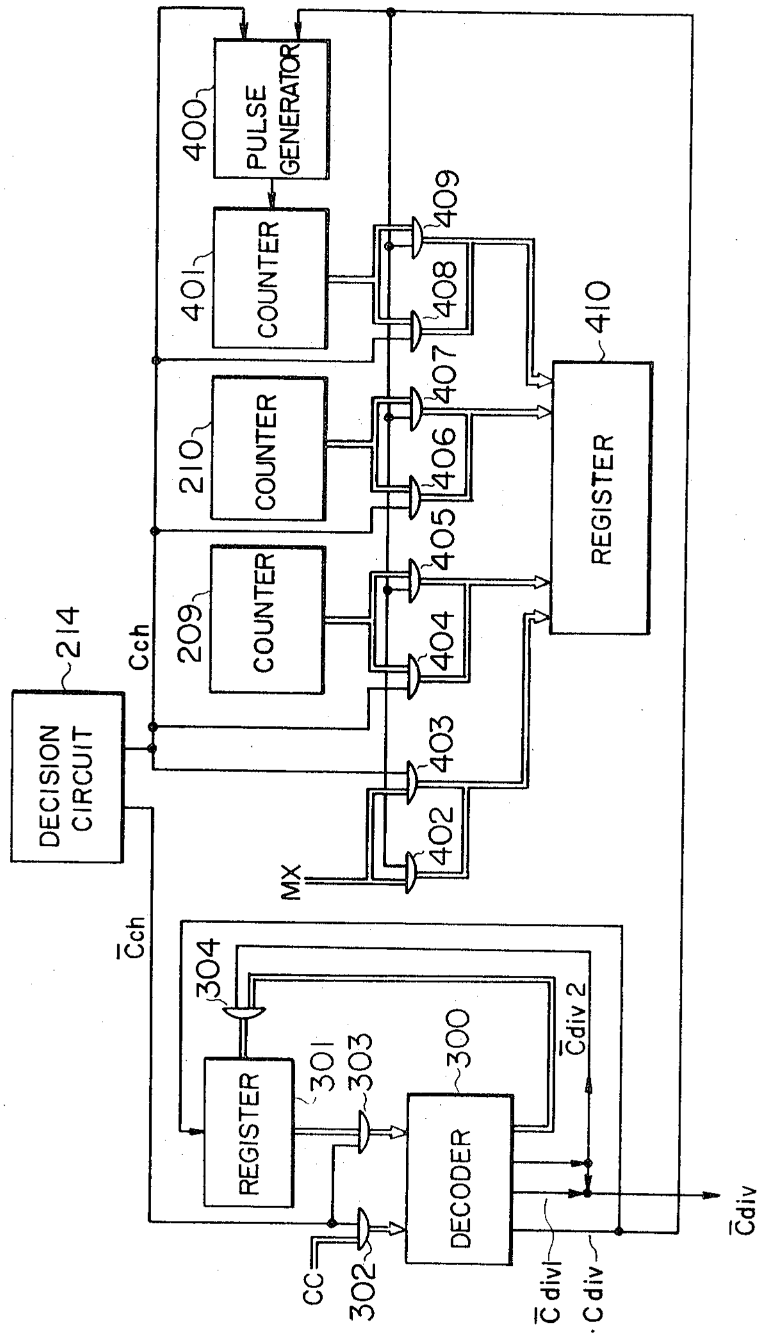
FIG. 7*a* is a combination of a dividing point processing apparatus and a characteristic point processing apparatus according to the present invention.

FIG. 7*a* shows the dividing point processing appartus 3 and the characteristic point processing apparatus 4. The dividing point processing apparatus 3 comprises a decoder 300, a register 301 for temporarily storing the monotonousness indicating direction code MF, and AND gates 302, 303 and 304.

The operation of the decoder 300 will be described with reference to FIG. 7*b* which shows a table relating the direction code CC to the monotonousness indicating direction code MF. The output direction code CC represents the output direction code at a position, while the monotonousness direction code MF represents the entire output direction code up to the present position. Now consider the case in which the monotonousness direction code MF is 0. When the scanning at the next position is performed in this state and, as a result, the direction code CC = 0 appears, the monotonousness direction code MF does not change and MF = 0 is maintained. However, if CC = 1 appears, the monotonousness direction code MF varies from 0 to 1. In the case of CC = 2 also, the code MF varies from 0 to 1. In the case of CC = 3, the table of FIG. 7*b* is blank. This is because the state MF = 0 and CC = 3 does not exist. Similar relations exist for other cases. However, the cases of MF = 1 and CC = 3; MF = 3 and CC = 0; and MF = 3 and CC = 1 are defined as dividing points due to lack of monotonousness. All the combinations of MF and CC other than these dividing points are true continuous points.

The reason why the values of the output direction code are taken to be 0 to 3 is that the scanning direction is downward from above and from right to left. Though the above description has been made with reference to the 3 × 3 mask, any other mask, for example the 5 × 5 mask, can be employed. For such other masks, the relation between CC and MF is different from that of FIG. 7*b*. The decoder 300 is constructed such that it satisfies the relation shown in FIG. 7*b*. To the decoder 300 are applied the signal CC and the output signal MF of the register 301 through the AND gates 302 and 303, respectively, which are controlled by the continuous point indicating signal $\overline{C}ch$ from the decision circuit 214. The decoder 300 outputs two control signals, the dividing point indicating signal Cdiv and the non-dividing point indicating signal (true continuous point indicating signal) $\overline{C}div$. The non-dividing point indicating signal $\overline{C}div$ consists of the indication signal $\overline{C}div2$ indicating the alteration of the monotonousness direction code MF and the non-dividing point indicating signal $\overline{C}div1$ which does not require the alteration of the monotonousness direction code MF in spite of the non-dividing point. The decoder 300 further outputs an altered MF determined by the signals CC and MF. The altered direction code MF is set in the register 301 through the AND gate 304 which is controlled by the indicating signal $\overline{C}div2$. In this case the register 301 has to be reset in advance. Though not illustrated, the reset instruction is made by the reset control signal generated accompanying the generation of the indication signal $\overline{C}div2$. When a dividing point is indicated, the then sub-chain terminates, so that the direction code MF is cleared and freshly reset simultaneously with the appearance of a fresh sub-chain. The clearance of the register 301 accompanying the dividing point indication is made by the indication signal C*div*.

The characteristic point processing apparatus 4 comprises AND gates 402 to 409, a pulse generator 400, a counter 401 and a register 410. The counters 209 and 210 are those shown in FIG. 4*a* for counting the coordinates $x$ and $y$, respectively. The counter 401 counts pulses generated by the pulse generator 400. The pulse generator 400 generates the count signal by being supplied with the characteristic point indicating signal C*ch* provided by the decision circuit 214 and the dividing point indicating signal Cdiv provided by the decoder 300. Consequently, the counter 401 counts the number of times $k$ of generation of the characteristic point and the dividing point (hereinafter referred to as the characteristic point sequence number). Upon the provision of the characteristic point indicating signal Cch the AND gates 403, 404, 406 and 408 are opened and the branch number MX, the coordinates $x$ and $y$ and the characteristic point sequency number $k$ are transmitted to the register 410 to be stored therein. On the other hand, upon the provision of the dividing point indicating signal C*div*, the AND gates 402, 405, 407 and 409 are opened to pass the branch number MX, the coordinates $x$ and $y$ and the characteristic point sequence number $k$ to the register 410. The information stored in the register 410 can be transferred to a predetermined address in the memory 211 indicated in advance in the order of the characteristic point sequence number, for example, to be stored therein.

Figure 9:
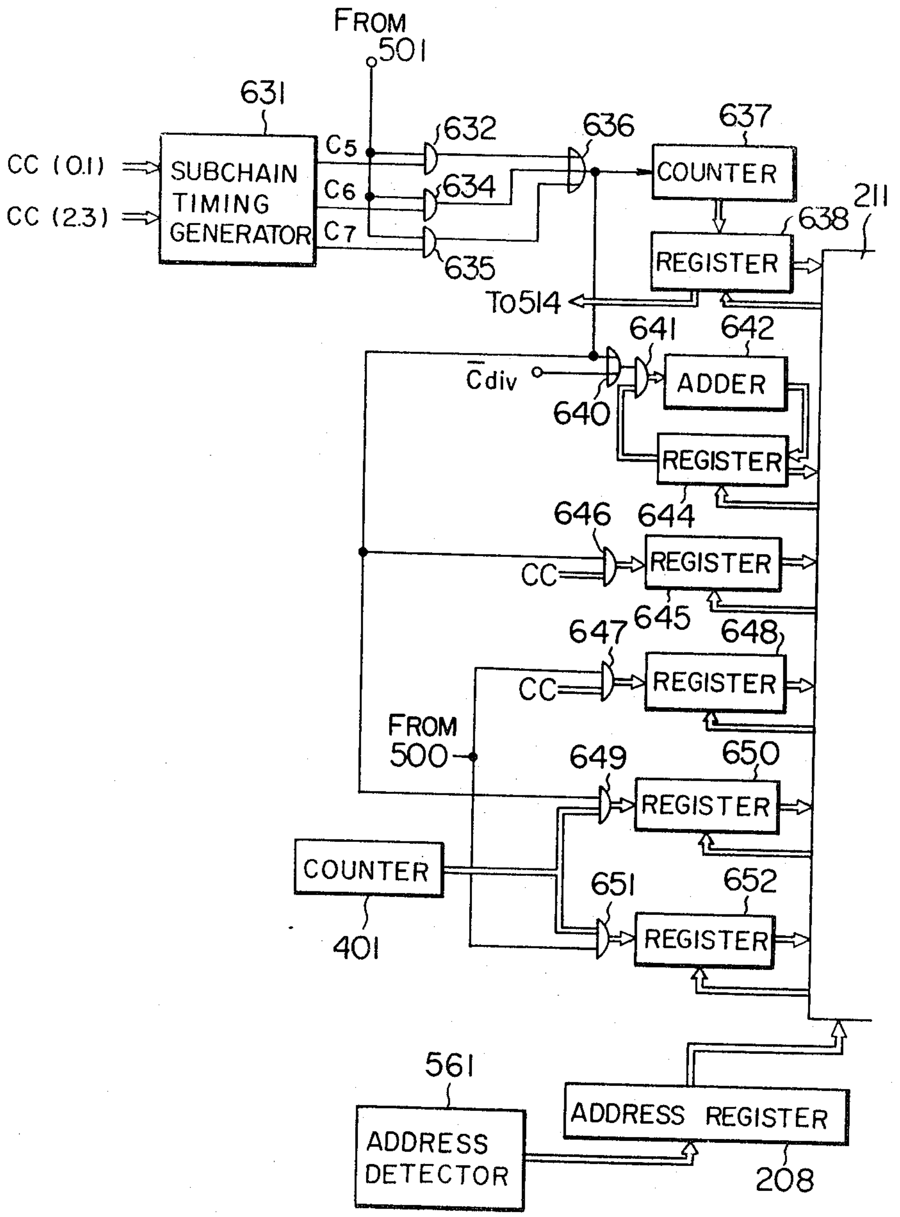
FIG. 9 is a data processing system of a sub-chain processing apparatus according to the present invention.
Figure 10:
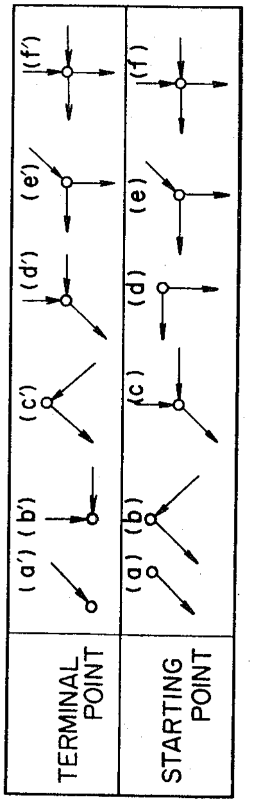
FIG. 10 is a diagram for explaining a terminal point and a starting point.

FIGS. 8 and 9 show the sub-chain processing apparatus 5. In particular, FIG. 8 shows the control system of the sub-chain processing apparatus, while FIG. 9 shows the data processing system of the sub-chain processing apparatus. The data read from the register 213 is supplied to a terminal point detector 500 and a starting point detector 501. A practical example of the terminal point and the starting point is shown in FIG. 10. Among the terminal points, ($a'$) and ($b'$) are terminal points proper, while ($c'$), ($d'$), ($e'$) and ($f'$) are combined terminal and starting points. Similarly, among the starting points, ($a$) and ($d$) are starting points proper, while ($b$), ($c$), ($e$) and ($f$) are combined starting and terminal points. For detection of these terminal and starting points masks of, for example, 3 × 3 are employed. At a terminal point which is at the same time a starting point the terminal point detection is first performed by the terminal point detector 500, and then a predetermined signal is supplied to the starting point detector 501 from the terminal point detector 500 to make the starting point detection. In the case of the starting point proper as those ($a$) and ($d$) in FIG. 10 a predetermined signal is supplied to the starting point detector 501 directly from the register 213 to detect the starting point.

As the starting point, there are double starting points as those ($d$), ($e$) and ($f$) in FIG. 10 besides single starting points ($a$), ($b$) and ($c$). At the double starting point the output direction code takes 0, 1 and 2, 3. The output directions 0, 1 and 2, 3 never exist simultaneously, but exist only as a combination thereof. Consequently, priority has to be determined between 0, 1 and 2, 3. The priority is determined by a priority determining circuit 502. In the following description priority is given to the output direction 0, 1.

On the other hand, as is seen from FIG. 3*a*, the direction of scanning a pattern is not the direction of the line element of the pattern, but in the $x$-and $y$-direction irrespective of the direction of the line element of the pattern. Consequently, the state of the scanned sub-chain, for example, the sub-chains I and II, has to be stored and related to the points $a''$ and $a'''$ encountered in the next scanning. For this purpose, the position in the $x$-direction of the appearance of the pattern has to be sought and held, and it has to be made clear to which sub-chain the position belongs. Further, as has been stated above, since the output directions 0,1 and 2,3 never exist simultaneously, two registers 528 and 529 are prepared, one 528 of which is employed for the subchain of the output direction code (0,1) and the other 529 of which is employed for the sub-chain of the output direction code (2,3). The registers 528 and 529 consist of bits corresponding to the scanning point number in the $x$-direction in units of a plurality of bits. The unit plurality of bits represent the sub-chain sequence number. In a simple pattern such as, for example, the numeral 0 to 9, the maximum number is eight or less in most cases. Consequently, in such a case it is only sufficient to take 3 bits to be a unit. The data in the registers 528 and 529 are supplied to a register 514 through gates 530 and 532, respectively, which gates are controlled by timing signals C3 and C4, respectively, from the priority determining circuit 502. The contents of the register 514 are stored in the registers 528 and 529 by timing signals C3′ and C4′, respectively, also from the priority determining circuit 502. The timing signals C3, C3′, C4 and C4′ are generated in this sequence. In the register 514 the setting and resetting of the subchain sequence number I are performed. Gates 515, . . . , 517 are ones for setting the sub-chain sequence number I in a predetermined $x$-position, and gates 516, . . . , 518 are ones for resetting the sub-chain sequence number I at a predetermined $x$-position. The gates 515, . . . , 517 are controlled by the set signal S, the decoding signal from a decoder 508 for decoding the $x$-position, the starting point detecting signal from the starting point detecting circuit 501 and the non-dividing point detecting signal from the dividing point detecting circuit 3000, while the gates 516, . . . , 518 are controlled by the reset signal R, the decode signal from the decoder 508, the non-dividing point detecting signal, and the terminal point detecting signal from the terminal point detecting circuit 500.

The decoder 508 receives the $x$-position from the counter 209 through a gate 509 which is controlled by the terminal point detecting signal and indicates a predetermined position 1, . . . , $x_{max}$ in the register 514. Upon the appearance of the terminal point detecting signal, since the sub-chain terminates, the sub-chain sequence number in the register 514 specified by the $x$-position has to be reset. This resetting operation is as follows. A gate 513 which is gated by the terminal point detecting signal and a gate determined by the said gating signal, the reset signal, and the position indicating signal from the decoder 508, for example the gate 516 when $x$=1 open to reset the sub-chain sequence number of $x$=1. On the other hand, in the case of the starting point or continuous point other than the terminal point the $x$-position in the counter 209 is supplied to gates 505, 506 and 507 through a gate 504 which is gated by the starting point or continuous point signal from a gate 503. The gates 505, 506 and 507 are gated by the signal from the priority determining circuit 502, that is, the gate 505 is gated by the control signal in the case of CC=0 or 1, the gate 506 is gated by the control signal in the case of CC=3, and the gate 507 is gated by the control signal in the case of CC=2. An adder circuit (Add − 1 circuit) 510 adds 1 and a substractor circuit (Sub − 1 circuit) 511 subtracts 1. Consequently, when the gate 505 is opened by CC=0 or 1, 1 is added to the $x$-position through the adder circuit 510 to give $x + 1$, while when the gate 506 is opened by CC=3, 1 is substracted from $x$ through the subtractor circuit 511 to cause $x - 1$. When CC=2, $x$ remains unaltered.

The above-described adding and subtracting operations are performed to relate the codes constituting the sub-chain to each other. When the starting point is detected at the position $x=x_i$, a sub-chain sequence number is generated (described below). When the direction code at the generation of the sub-chain sequence number is 0 or 1, the sub-chain code succeeding the starting point of the sub-chain is expected to lie at the position $x_i + 1$. On the other hand, when CC=3, the next sub-chain code is expected to lie at the position $x_i - 1$. Consequently, when a starting point is detected, if the direction code at that time is CC=0 or 1, it is only sufficient to set the sub-chain sequence number at that time at the position $x_i + 1$ in the register 514, and if CC=3, it is only sufficient to set the sub-chain sequence number at that time at the position $x_i - 1$. Then a continuous point next appears (in principle a starting point is followed by a continuous point), whether or not the sub-chain sequence number is set at the position at that time is affirmed. If it is set, the above-mentioned sub-chain sequence number is shifted to the position $x_i + 1$ or $x_i - 1$ depending on the content of the direction code regarding the sub-chain as being yet continuing. When the direction code CC=2, the value of $x$ has not changed, so that the adding or subtracting operation is not performed.

If a starting point is detected, $x_i + 1$, $x_i - 1$, and $x_i$ are supplied to the decoder 508 as required depending on the content of the direction code. The value decoded by the decoder 508 is supplied to either one of the set gates 515, . . . , 517. Since the gates 515, . . . , 517 are supplied with the starting signal from the starting point detecting circuit 501 as has been described above, the decoded signal from the decoder 508 open a predetermined gate to set the then sub-chain sequence number I at the position in the register specified by the decoded signal. In case there are two starting points, when CC=0 or 1, the content of the register 528 is first read in the register 514 through the gate 530 by the timing signal C3 from the priority determining circuit 502. Then the above-described set operation is performed to set the sub-chain sequence number, and the result thereof is stored in the register 528 through the gate 531 by the timing signal C3′. Next, when CC=2 or 3, the content of the register 529 is read in the register 514 through the gate 532 by the timing signal C4. A newly specified sub-chain sequence number is similarly set, and the result thereof is stored in the register 529 through the gate 533 by the timing signal C4′.

Next, when a continuous point is detected at a new position while the scanning point is shifting, the $x$-position specified by the counter 209 is supplied to the decoder 508 through the gate 509 which is opened by the continuous point signal C*div* supplied through the gate 560. On the other hand, upon the generation of the above-mentioned continuous point signal the priority determining circuit 502 first generates the timing signal C3 to read the content of the register 528 in the register 514 through the gate 530. The $x$-coordinate decoded by the decoder 508 is supplied to the gate specified by the $x$-coordinate among the output gates 521, 522, . . . , 523 and 524 of the register 514. Detector circuits 519, . . . , 520 are ones which detect whether or not the sub-chain sequence numbers are set at respective positions in the register 514. Consequently, the gate specified by the decoded signal provided by the decoder 508, for example the gate 521 if $x$=1, is opened by the signal from the detector circuit 519 to generate the detecting signal. If a sub-chain sequence number is not set at the first position in the register 514, the gate 521 is not opened, at which time the timing signal C4 is generated to read the content of the register 529 in the register 514.

If the detecting signal is obtained from the gate 521, a reset signal for the reset gates are generated (not shown) to open the gate 516 corresponding to the predetermined position, i.e., $x$=2 in the register 514 indicated by the decoder 508, thereby resetting the sub-chain sequence number at that position. On the other hand, the detecting signal outputted by the predetermined gate 521 among the output gates is supplied to the priority determining circuit 502. This detecting signal is temporarily delayed by the priority determining circuit 502 for the period of time during which the sub-chain sequence number at a predetermined position in the register 514 is reset, and upon the completion of the reset it supplies the signals corresponding to the direction code to the gates 505, 506 and 507 to select them, and after it modifies the $x$-coordinate from the counter 209 as required it supplies the modified $x$-coordinate to the decoder 508. The gate corresponding to the predetermined position among the read-out gates 522, . . . , 524 is opened before the register 514 is reset to set the sub-chain sequence number in a register 527. If in this state the priority determining circuit 502 starts its operation to supply the $x$-coordinate according to the direction code to the decoder 508, the $x$-coordinate is decoded to be supplied to the predetermined one of the set gates 515, . . . , 517. On the other hand, a set signal is generated (not shown) by the detecting signal temporarily delayed by the priority determining circuit 502 and supplied to the gates 515, . . . , 517. Consequently, the sub-chain sequence number temporarily stored in the register 527 and formerly reset is set therein.

The sub-chain sequence number based on the thus newly set continuous point specifies the dwell position of the next continuous point. The content of the register 514 is written in the register 528 or 529. In the case of the terminal point, as has been described above, the $x$-coordinate is applied by the timing signal C3′ or C4′ to the decoder 508 through the gate 509, and the sub-chain sequence number at the predetermined positions in the registers 528 and 529 is reset through the register 514.

Each time the content of the register 514 is changed accompanying the generation of the starting point, terminal point or continuous point, the content of the register 514 is allocated to either one of the registers 528 and 529 through the gates 531, . . . , 533. The circuit 561 is a kind of decoder which converts the sub-chain sequence number read out in the register 527 into the address in the memory or the like. As has been described with reference to FIGS. 3*a* to 3*e*, the sub-chain consists of a number of data. The number of data change each other among the codes constituting the sub-chain. Consequently, if a starting point is detected so that various data of the sub-chain based on the starting point are detected, the data are temporarily stored. The storing position must be identical also for the continuous point succeeding the starting point. That is, the position at which the data are stored must be fixed for each sub-chain. An effective expedient for specifying the memory position for each sub-chain is the utilization of the sub-chain sequence number. The address detecting circuit 561 is a device for setting such an address from the sub-chain sequence number. Consequently, the sub-chain sequence number may be set at the memory position as it is or an absolute value may be added to the sub-chain sequence number. The former is effective for employing a register as the memory, while the latter is effective for employing a large capacity memory such as a magnetic core as the memory.

FIG. 9 shows a system for detecting various data of each sub-chain. The data in this system consist of the five kinds of data, the sub-chain sequence number I, the code number MC constituting the sub-chain, the output direction code SD at the time of starting of the sub-chain, the direction code ED at the time of termination of the sub-chain, the characteristic point sequence number SS at the starting point of the sub-chain, and the characteristic point sequence number EE at the terminal point of the sub-chain.

A sub-chain timing generating circuit 631 receives the direction code CC to generate three control signals C5, C6, and C7. The control signal C5 is generated when the starting point has either of the direction codes of the dividing point CC=0,1 and CC=2,3. The control signal C6 is generated when priority is given to CC=0,1 between simultaneously occurring CC=0,1 and CC=2,3. The control signal C7 is generated after being temporarily delayed after CC=0,1 as a control signal for CC=2,3. The control signals C5, C6 and C7 are gated concomitantly with the starting point signal at gates 632, 634 and 635, respectively. The control signal passed through a gate 636 is supplied to a counter 637 which counts the sub-chain sequence numbers each time of arrival of the control signal. The counted sub-chain sequence number is supplied to a register 638 to be temporarily stored therein. The counted sub-chain sequence number is set, upon the generation of the starting point, in the register 638 as a register number, and is, at the same time, stored at the predetermined address in the memory 211 specified by the address detecting circuit 561.

A register 644 temporarily stores the code length of a predetermined sub-chain. The register 644 is temporarily storing the code length CM read from the address indicated by the address detecting circuit 561 with respect to some sub-chain. The read out code length CM is augmented by 1 to MC+1 by an adder 642 (Add − 1) which adds 1 through a gate 641 each time the continuous point signal *Cdiv* from a gate 640 is supplied thereto, MC+1 being transferred to the register 644 to be stored therein. The starting point signal is supplied to the gate 641 from the gate 636 to add 1 to the signal in the register 644 when a starting point appears. This is because at the starting point, MC=0 and hence 1 is merely set as MC.

In a register 645 for storing the starting point direction code SD the direction code SD is set through a gate 646 by the starting point signal each time the starting point appears, while in a register 648 for storing the terminal point direction code ED the direction code ED is set through a gate 647 each time the terminal point signal is generated.

Registers 650 and 652 temporarily store the characteristic point number SS at the starting point and the characteristic point number EE at the terminal point, respectively. In the register 650 the characteristic point number SS is set through a gate 649 which is opened by the starting point signal from the characteristic point counter 401, while in the register 652 the characteristic point number EE is set through a gate 651 which is opened by the terminal point signal from the characteristic point counter 401.

The temporarily stored data are indicated by the address detecting circuit 561 and written in each time the operation of one code is completed at the predetermined addresses in the memory 211 which is gated by the address register 208. At the continuous point the stored data are read from the addresses indicated by the address detecting circuit 561 in the respective registers each time the continuous point is detected. In the drawing the write-in and read-out control is omitted. Since MF which in FIG. 3*e* constitutes one of the various data of the sub-chain is provided by the register 301 in FIG. 7*a*, MF can be treated as various data similarly in the above-described manner if MF temporarily stored in the register 301 is treated in a similar manner to the information in the above-mentioned registers to be accorded to the indicated address of the address detecting circuit 561. The coordinates $(x, y)$ at which the characteristic point appears can also similarly be treated.

As can be seen from the above-described embodiment of the present invention, a minimum data in the present invention is the detected element of feature due to slope. In particular, in the present invention the detected element is defined by the sub-chain, the sub-chain being taken to be a principal constitutent of the pattern. As other constitutents of the sub-chain the code number MC, the starting point direction code and the terminal point direction code are added thereto to increase the practical reliability of the sub-chain. The concept of detecting the slope according to the present invention does never restrict the present invention. Though to identify the slope scanning is performed downward from above and from right to left in the above embodiment, any other identifying method can be employed as required. Further, the present invention can be applied not only to a line pattern but also to other patterns such as a pattern having width and a contour pattern.

We claim:

1. A pattern feature detection system comprising:

first means for receiving an input pattern and for converting said input pattern into a segmented line pattern;

second means, coupled to said first means, for subjecting said line pattern to a mask logic operation, by comparing sequential portions of said line pattern to each of a prescribed number of masks and for providing outputs respectively representative of a branch number corresponding to the total number of said masks, the individual line patterns of which correspond to the sequential portion of the line pattern being compared, an output direction code number corresponding to the total number of masks among selected ones of said masks, the individual line patterns of which correspond to the sequential portions of the line pattern being compared, and a direction code corresponding to the directions defined by those masks among said selected ones of said masks, the individual line patterns of which correspond to the sequential portions of the line pattern being compared, and for producing an output representative of whether a point on said line pattern subjected to said mask logic operation is a characteristic point or a non-characteristic point in accordance with the values of said branch and output direction code numbers;

third means, responsive to the output of said second means, for determining whether a non-characteristic point is a dividing point or a continuous point, by detecting whether the slope at a point of the line pattern is monotonously increasing, decreasing or unchanged;

fourth means, responsive to said second and third means, for storing information representative of the coordinates of the line pattern of each characteristic point and each dividing point; and fifth means, responsive to said second and third means, for generating and storing a code and a number representative of each sub-chain into which said segmented line pattern is divided between respective dividing and characteristic points.

2. A pattern feature detection system according to claim 1, wherein said second means includes means for producing an output representative of a non-characteristic point only in response to the values of said branch member and said output direction code number being respectively equal to 2 and 1, and for producing an output representative of a characteristic point for other values.

3. A pattern feature detection system according to claim 1, wherein said third means is further coupled to the output of said fifth means for receiving therefrom an advance direction code representative of the direction of slope of a previously compared pattern portion and includes means for comparing said advance direction code with the direction codes of said masks of said second means, so as to produce an output indicative of whether said slope is monotonously increasing or decreasing.

4. A pattern feature detection system according to claim 1, wherein a characteristic point of a line portion corresponds to a starting point, a branch point, and a terminal point, while a non-characteristic point corresponds to a continuous point or a dividing point.

5. A pattern feature detection system according to claim 4, wherein each non-characteristic point is located between a starting point and a terminal point.

6. A pattern feature detection system according to claim 1, wherein said third means comprises a first decoder, a first register, and a first logic circuit, said first decoder and said first register being coupled in a loop through said first logic circuit, which receives a non-characteristic point indicating signal and an output direction code signal from said second means, said first decoder supplying a pair of signals respectively representative of a dividing point and a true continuous point.

7. A pattern feature detection system according to claim 1, wherein said fourth means comprises a pulse generator coupled to the outputs of said second and third means, for generating a prescribed count signal, a first counter circuit connected to said pulse generator, for counting the pulses generated thereby, to provide a first count signal representative of the number of occurrences of a characteristic point and a dividing point during the scan of a pattern, and a first logic circuit, coupled to said second and third means, and responsive to the scan of the coordinates over which said line pattern is defined, for providing signals representative of said branch number, the coordinates of a point of said pattern and a characteristic point sequence number, and a storage register for storing the outputs of said first logic circuit.

8. A pattern feature detection system according to claim 1, wherein said second means comprises a first plurality of m storage registers sequentially connected for storing and shifting data bits corresponding to said segmented line pattern;

a second plurality of *m*, *n*-bit registers connected to the outputs of each register of said first plurality for storing signals representative of the respective masks for said mask logic operation, wherein the product of the number of *n*-bits and the *m* number of registers of said second plurality corresponds to the data size of an individual mask, wherein *m* and *n* are integers;

a first decoder connected to the outputs of the registers of said second plurality, for providing respective address signals corresponding to the respective patterns of said masks, an address register connected to said first decoder, for said respective address signals, a first memory containing a plurality of address storage positions each of which corresponds to an individual mask, for receiving respective address signals from said address register, a data register for temporarily storing a decoded address location from said first memory, and a decision circuit, coupled to the output of said data register through a further register which receives each output provided by said data register, for generating a first signal representative of the decoding of a characteristic point, and a second signal representative of the decoding of a non-characteristic point.

9. A pattern feature detection system according to claim 8, wherein said third means comprises a second decoder, a first register, and a first logic circuit, said second decoder and said first register being coupled in a loop through said first logic circuit, which receives an output direction code signal from said decision circuit and a non-characteristic indicating signal, said second decoder supplying a pair of signals respectively representative of a dividing point and a true continuous point.

10. A pattern feature detection system according to claim 9, wherein said fourth means comprises a pulse generator coupled to the outputs of said decision circuit and said second decoder, for generating a prescribed count pulse signal, a first counter circuit, connected to said pulse generator, for counting the pulses generated thereby, to provide a first count signal representative of the number of occurrences of a characteristic point and a dividing point during the scan of a pattern, a second logic circuit, coupled to said second decoder, said second means, and responsive to the scan of the coordinates over which said line pattern is defined, for providing signals representative of said branch number, the coordinates of a point of said pattern and a characteristic point sequence number, and a storage register for storing the outputs of said second logic circuit.

11. A pattern feature detection system according to claim 9, wherein said fifth means comprises point detector means, coupled to said further register of said second means, for generating a pair of outputs respectively representative of a terminal point and a starting point of said line pattern, register means for storing data corresponding to the scanning point in a direction over which said line pattern is scanned for a pair of output direction codes, means coupled to said point detector means and said register means, for storing sub-chain sequence number data, and means, coupled to said point detector means, and said sub-chain sequence number data storing means, for enabling the transfer and storage of sub-chain sequence number data in a predetermined address location of said first memory of said second means.

12. A pattern feature detection system comprising:

a. preliminary processing means for shaping an input pattern into a line pattern;

b. mask logic decoding means, including a plurality of masks, for detecting the branch number indicating the number of masks which are satisfied by the line pattern among said all masks, the output direction code number indicative of the number of masks which are satisfied by the line pattern among the predetermined masks and direction codes indicating codes of masks which are satisfied by the line pattern among the predetermined masks by subjecting the line pattern to a mask logic operation and for determining whether a point obtained by the mask logic operation is a characteristic point or a non-characteristic point by the branch number and the output direction code number;

c. dividing point processing means for determining whether the non-characteristic point is a dividing point or a continuous point by detecting whether the slope at any point of the line pattern is monotonously increasing or decreasing or not;

d. characteristic point processing means for storing information indicative of coordinates of the characteristic point and the dividing point, e. sub-chain processing means for extracting and storing codes and numbers representing sub-chains defined by the dividing point and the characteristic point; and wherein the simultaneous existence of the branch number MX equal to 2 and the output direction code number CN equal to 1 determines whether a point is a non-characteristic point or a characteristic point.

* * * * *